(12) United States Patent
Hirosaki et al.

(10) Patent No.: US 7,598,194 B2
(45) Date of Patent: Oct. 6, 2009

(54) OXYNITRIDE POWDER AND PRODUCTION METHOD THEREOF

(75) Inventors: Naoto Hirosaki, Tsukuba (JP); Takayuki Suehiro, Tsukuba (JP)

(73) Assignee: National Institute for Materials Science, Tsukuba-shi, Ibaraki (JP)

( * ) Notice: Subject to any disclaimer, the term of this patent is extended or adjusted under 35 U.S.C. 154(b) by 296 days.

(21) Appl. No.: 10/588,008

(22) PCT Filed: Apr. 22, 2005

(86) PCT No.: PCT/JP2005/008313

§ 371 (c)(1),
(2), (4) Date: Aug. 1, 2006

(87) PCT Pub. No.: WO2005/102921

PCT Pub. Date: Nov. 3, 2005

(65) Prior Publication Data

US 2007/0166218 A1 Jul. 19, 2007

(30) Foreign Application Priority Data

Apr. 26, 2004 (JP) .............................. 2004-129133

(51) Int. Cl.
| | | |
|---|---|---|
| C01B 13/00 | (2006.01) | |
| C01B 13/04 | (2006.01) | |
| C01B 33/20 | (2006.01) | |
| C01B 33/24 | (2006.01) | |
| C01B 33/26 | (2006.01) | |
| C01B 33/32 | (2006.01) | |
| C01D 15/00 | (2006.01) | |
| C01F 1/00 | (2006.01) | |
| C01F 5/00 | (2006.01) | |
| C01F 7/00 | (2006.01) | |
| C01F 11/00 | (2006.01) | |
| C01F 17/00 | (2006.01) | |
| C04B 35/00 | (2006.01) | |
| C04B 35/01 | (2006.01) | |
| C04B 35/10 | (2006.01) | |
| C04B 35/117 | (2006.01) | |
| C04B 35/14 | (2006.01) | |
| C04B 35/16 | (2006.01) | |
| C04B 35/18 | (2006.01) | |
| C04B 35/597 | (2006.01) | |
| C04B 35/599 | (2006.01) | |
| C04B 35/622 | (2006.01) | |
| C04B 35/64 | (2006.01) | |
| C04B 35/65 | (2006.01) | |

(52) U.S. Cl. .................... 501/98.1; 501/98.2; 423/21.1; 423/111; 423/115; 423/155; 423/179; 423/326; 423/327.1; 423/331; 423/332; 423/593.1; 423/594.15; 423/594.16; 423/600

(58) Field of Classification Search ................. 423/115, 423/326, 327.1, 331, 332, 593.1, 594.15, 423/594.16, 600, 21.1, 111, 155, 179; 501/98.1, 501/98.2

See application file for complete search history.

(56) References Cited

U.S. PATENT DOCUMENTS

| 4,845,059 A | * | 7/1989 | Kohtoku et al. ............. 501/98.1 |
| 5,411,762 A | * | 5/1995 | Thebault et al. ............. 427/226 |
| 6,632,379 B2 | * | 10/2003 | Mitomo et al. ........ 252/301.4 R |

FOREIGN PATENT DOCUMENTS

| JP | S62-223009 A | 10/1987 |
| JP | 2001-026407 A | 1/2001 |

OTHER PUBLICATIONS

J.W.H. van Krevel et al. Luminescence Properties of Terbium-, Cerium-, or Europium-Doped alpha-Sialon Materials, 2002, Journal of Solid State Chemistry, vol. 165, No. 1, p. 19-24.*

* cited by examiner

*Primary Examiner*—Timothy C Vanoy
*Assistant Examiner*—Serena L Hanor
(74) *Attorney, Agent, or Firm*—Manabu Kanesaka (57) ABSTRACT

It is aimed at providing an oxynitride powder, which is suitable for usage as a phosphor, is free from coloration due to contamination of impurities, and mainly includes a fine α-sialon powder.

An oxynitride powder is produced by applying a heat treatment in a reducing and nitriding atmosphere, to a precursor compound including at least constituent elements M, Si, Al, and O (where M is one element or mixed two or more elements selected from Li, Mg, Ca, Sr, Y, La, Ce, Pr, Nd, Sm, Eu, Gd, Tb, Dy, Ho, Er, Tm, Yb, and Lu), thereby decreasing an oxygen content and increasing a nitrogen content of the precursor.

17 Claims, 3 Drawing Sheets

OXYNITRIDE POWDER AND PRODUCTION METHOD THEREOF

TECHNICAL FIELD

The present invention relates to an oxynitride powder and a production method thereof. More particularly, the present invention relates to an oxynitride powder and a production method thereof, where the oxynitride powder is suitable for usage as a phosphor, is free from coloration due to contamination of impurities, and mainly includes a fine α-sialon.

BACKGROUND ART

α-sialon is a compound represented by a general formula $M_xSi_{12-(m+n)}Al_{m+n}O_nN_{16-n}$, which is provided by an α-type silicon nitride crystal including Al and O dissolved therein in a substitutional solid state and a metal element M dissolved therein in an interstitial solid state.

x, m, and n are parameters which determine the dissolved amounts of the applicable elements in solid states (i.e., the composition of the sialon), and take values in the ranges of $0<x\leq2$, $0<m\leq6$, and $0<n\leq3$, respectively.

Known examples of a metal element M forming an α-sialon include: Li, Mg, Ca, Sr, Y, La, Ce, Pr, Nd, Sm, Eu, Gd, Tb, Dy, Ho, Er, Tm, Yb, Lu, and the like. α-sialon sintered bodies are excellent in heat resistance, corrosion resistance, and the like, and are thus used as cutting tools, heat-resistant machine parts, and the like.

Further, there is recently expected a usage of α-sialon as a phosphor (see patent-related reference 1) which is provided by dissolving a photoactive metal such as Eu in a lattice of α-sialon in a solid state so that the resultant solid solution is excited by ultraviolet light or blue light to thereby emit visible light.

Examples of typical production methods of α-sialon include a reactive sintering method for molding a mixed powder of a silicon nitride powder, an aluminum nitride powder, and oxides of metal M, and heating the molding to 1,700 to 1,800° C., to thereby obtain a solid sintered body. Also known as a synthesis method of powdery α-sialon, is a carbothermal reduction-nitridation method (see patent-related reference 2) for adding a carbon powder into silicon oxide, aluminum oxide, and oxide of metal M, and for heating the resultant mixture to 1,400 to 1,700° C. within a nitrogen atmosphere, to thereby obtain a powder.

However, to be obtained by the reactive sintering method is not a fine powder, but a dense sintered body. In turn, although there can be obtained a fine powder of α-sialon having a particle size of 0.1 to 2 μm by the carbothermal reduction-nitridation method, the added carbon is left in a final product to thereby cause coloration, which is undesirable for optical usage.

Known as a synthesis method of a high purity nitride powder other than α-sialon, is one (see patent-related reference 3) for reducing and nitriding an aluminum oxide powder in a mixed gas of ammonia and hydrocarbon, thereby obtaining an aluminum nitride powder.

There has been further reported a method (see patent-related reference 4) for reducing and nitriding a silicon oxide powder within a mixed gas of ammonia and hydrocarbon, thereby obtaining a silicon nitride powder.

However, there have not been yet established methods for synthesizing powders which are highly pure in nature, fine in size, and less in impurities, insofar as concerned with α-sialon.

[Patent-Related References]
Patent-related reference 1: JP-A-2002-363554
Patent-related reference 2: JP-4-60050
Patent-related reference 3: JP-A-2002-97006
Patent-related reference 4: JP-7-91043

DISCLOSURE OF THE INVENTION

Problem to be Solved by the Invention

It is therefore an object of the present invention to provide an oxynitride powder which is suitable for usage as a phosphor, is free from coloration due to contamination of impurities, and mainly includes a fine α-sialon.

Means for Solving the Problem

Under such circumstances, the present inventors have earnestly and repeatedly investigated a technique for reacting a gas as a reducing and nitriding atmosphere with a precursor compound including elements constituting a sialon, and resultingly appreciated that a precursor compound having a specific precursor composition is brought into an α-sialon powder by a firing reaction, and that there can be obtained a fine powder less in carbon impurities which affect optical characteristics, by implementing configurations recited in the following items (1) through (20) as a result of a further investigation of the appreciation mentioned just above.

The present invention has been achieved based on such appreciations. The configurations of the present invention are recited in the following items (1) through (20).

(1) A production method of an oxynitride powder, characterized in that the method comprises the step of:

applying a heat treatment in a reducing and nitriding atmosphere, to a precursor compound including at least constituent elements M, Si, Al, and O (where M is one element or mixed two or more elements selected from Li, Mg, Ca, Sr, Y, La, Ce, Pr, Nd, Sm, Eu, Gd, Tb, Dy, Ho, Er, Tm, Yb, and Lu), thereby decreasing an oxygen content and increasing a nitrogen content of the precursor.

(2) The production method of an oxynitride powder of item 1, characterized in that the precursor compound includes nitrogen (N) therein.

(3) The production method of an oxynitride powder of item 1 or 2, characterized in that the method further comprises the step of:

applying a heat treatment in a reducing and nitriding atmosphere, to the precursor compound, thereby decreasing an oxygen content and increasing a nitrogen content of the precursor, to produce an α-sialon represented by a general formula $M_xSi_{12-(m+n)}Al_{m+n}O_nN_{16-n}$ ($0<x\leq2$, $0<m\leq6$, and $0<n\leq3$).

(4) The production method of an oxynitride powder of any one of items 1 through 3, characterized in that the precursor compound is a mixture of: a compound (compound SiX) which turns into silicon dioxide, silicon oxynitride, or silicon nitride, by heating; a compound (compound MX) which turns into oxide, oxynitride, or nitride of M by heating; and a compound (compound AlX) which turns into aluminum oxide, aluminum oxynitride, or aluminum nitride, by heating.

(5) The production method of an oxynitride powder of item 4, characterized in that the SiX is one compound or mixed two or more compounds selected from silicon dioxide ($SiO_2$), silicon oxynitride ($Si_2N_2O$), and silicon nitride ($Si_3N_4$).

(6) The production method of an oxynitride powder of any one of items 4 through 5, characterized in that the MX is one compound or mixed two or more compounds selected from oxide, hydroxide, alkoxide, carbonate, nitrate, and chloride, of M.

(7) The production method of an oxynitride powder of any one of items 4 through 6, characterized in that the AlX is one compound or mixed two or more compounds selected from oxide, hydroxide, alkoxide, carbonate, nitrate, and chloride, of aluminum.

(8) The production method of an oxynitride powder of any one of items 4 through 7, characterized in that MX particles and AlX particles have averaged particle sizes smaller than that of SiX particles, respectively.

(9) The production method of an oxynitride powder of any one of items 4 through 7, characterized in that the SiX has an averaged particle size of 2 μm or less.

(10) The production method of an oxynitride powder of any one of items 4 through 9, characterized in that the MX and AlX are attached to a surface of the SiX.

(11) The production method of an oxynitride powder of any one of items 4 through 10, characterized in that the precursor compound is a mixture obtained by dispersing SiX particles in a solution including the MX and AlX dissolved therein followed by drying and desolvation, the mixture being in a form where compounds of the M and Al are attached to a surface of a SiX particle.

(12) The production method of an oxynitride powder of any one of items 4 through 11, characterized in that the precursor compound is a complex citrate obtained by dispersing the SiX in an aqueous solution including the MX and AlX dissolved therein, followed by addition of citric acid and by drying and dehydration.

(13) The production method of an oxynitride powder of any one of items 4 through 12, characterized in that the precursor compound is a compound obtained by applying a heat treatment to a complex citrate to thereby decompose and eliminate citric acid therefrom, the complex citrate being obtained by dispersing the SiX in an aqueous solution including the MX and AlX dissolved therein, followed by addition of citric acid and by drying and dehydration.

(14) The production method of an oxynitride powder of any one of items 1 through 13, characterized in that the reducing and nitriding atmosphere includes at least an ammonia gas.

(15) The production method of an oxynitride-powder of any one of items 1 through 14, characterized in that the reducing and nitriding atmosphere is a mixed gas atmosphere of ammonia and hydrocarbon gas.

(16) The production method of an oxynitride powder of item 15, characterized in that the hydrocarbon gas is a methane or propane gas.

(17) The production method of an oxynitride powder of any one of items 1 through 16, characterized in that the M includes at least Ca.

(18) The production method of an oxynitride powder of any one of items 1 through 17, characterized in that the M includes at least Eu.

(19) The production method of an oxynitride powder of any one of items 1 through 18, characterized in that the method further comprises the step of:

adding, into the precursor compound, one reaction accelerator or mixed two or more reaction accelerators selected from fluoride, chloride, sulfate, phosphate, and borate of an element selected from calcium, potassium, and aluminum, followed by a heat treatment in a reducing and nitriding atmosphere, thereby decreasing an oxygen content and increasing a nitrogen content of the precursor, to produce an α-sialon represented by a general formula $M_x Si_{12-(m+n)} Al_{m+n} O_n N_{16-n}$ (0<x≦2, 0<m≦6, and 0<n≦3)

(20) An oxynitride powder characterized in that the oxynitride powder is an α-sialon powder produced by the method of any one of items 1 through 19, and that the α-sialon powder is represented by $Ca_{x1} Eu_{x2} Si_{12-(m+n)} Al_{m+n} O_n N_{16-n}$ while fully satisfying conditions of:

0.4≦x₁≦1.5, 0.01≦x₂≦0.4, 0.8≦m≦3, and

0≦n≦2.

BEST MODE FOR CARRYING OUT THE INVENTION

The present invention will be described in detail based on the following Examples and drawings.

In the present invention, used as a precursor compound is one including at least constituent elements M, Si, Al, and O (where M is one element or mixed two or more elements selected from Li, Mg, Ca, Sr, Y, La, Ce, Pr, Nd, Sm, Eu, Gd, Tb, Dy, Ho, Er, Tm, Yb, and Lu).

Further, it is possible to adopt a precursor compound which includes nitrogen (N) in addition to the constituent elements, as required. Among the constituent elements of the precursor, most of M, Si, and Al are left in the reaction product, without vaporization during firing.

Meanwhile, part of O reacts with an atmospheric gas during firing and is removed out of the reaction product, and instead thereof, N of the reactive gas is introduced into the reaction product. In this way, there is synthesized, from the precursor compound, an oxynitride of an α-sialon composition comprising M—Si—Al—O—N.

Usable as a precursor compound is a mixture of: a compound (compound SiX) which turns into silicon dioxide, silicon oxynitride, or silicon nitride, by heating; a compound (compound MX) which turns into oxide, oxynitride, or nitride of M by heating; and a compound (compound AlX) which turns into aluminum oxide, aluminum oxynitride, or aluminum nitride, by heating.

The compound which turns into silicon dioxide by heating, is one which turns into silicon dioxide by heating in air, in an atmosphere including oxygen, or in an inert atmosphere; and the compound which turns into silicon oxynitride or silicon nitride by heating, is one which turns into silicon oxynitride or silicon nitride by heating in an atmosphere of gas containing constituent molecules including elemental nitrogen such as nitrogen gas or ammonia, or in an inert atmosphere.

Examples of SiX include silicon dioxide ($SiO_2$: silica glass, silica sol, silica gel, and crystalline silica), silicon oxynitride ($Si_2N_2O$), silicon nitride ($Si_3N_4$: α-type crystal, β-type crystal, amorphous), and the like.

The compound which turns into oxide of M by heating, is one which turns into oxide of M by heating in air, in an atmosphere including oxygen, or in an inert atmosphere; and the compound which turns into oxynitride or nitride of M by heating, is one which turns into oxynitride or nitride of M by heating in an atmosphere of gas containing constituent molecules including elemental nitrogen such as nitrogen gas or ammonia, or in an inert atmosphere.

Examples of MX include oxide, hydroxide, alkoxide, carbonate, nitrate, chloride, fluoride, organic acid salt, and citrate, of M.

The compound which turns into aluminum oxide by heating, is one which turns into aluminum oxide by heating in air, in an atmosphere including oxygen, or in an inert atmosphere; and the compound which turns into aluminum oxynitride or aluminum nitride by heating, is one which turns into aluminum oxynitride or aluminum nitride by heating in an atmosphere of gas containing constituent molecules including elemental nitrogen such as nitrogen gas or ammonia, or in an inert atmosphere.

Examples of AlX include oxide, hydroxide, alkoxide, carbonate, nitrate, chloride, fluoride, organic acid salt, and citrate, of Al.

It is preferable to determine ratios of elements M, Si, and Al in a precursor so as to attain $M_xSi_{12-(m+n)}Al_{m+n}O_nN_{16-n}$ ($0<x\leq2$) after reduction and nitridation. It is desirable to adopt such a composition that O is included more than in a final product, in terms of ratio to N.

In firing the precursor of the thus determined composition, there is controlled a firing reaction based on time in a manner to finish the reaction at the time where the O/N ratio has reached a predetermined value, thereby enabling obtainment of an α-sialon of a predetermined composition.

When it is desired to obtain a particularly fine powder, the following method is preferable. Namely, there are adopted SiX having an averaged particle size of 2 μm or less, and MX particles and AlX particles having averaged particle sizes smaller than that of SiX particles, and more preferably, there is adopted a precursor having a form where MX and AlX are attached to a surface of SiX.

Starting with a precursor of such a form causes MX and AlX to react at a surface of SiX during heating in a manner to effectively form an α-sialon at a relatively low temperature, thereby allowing synthesis of a fine α-sialon which is similar to the SiX in size.

As a starting material as the SiX in this technique, silicon dioxide and silicon nitride are each particularly desirable, since an excellent reactivity is provided and a fine powder is obtained then.

Although methods for obtaining a precursor of such a form are not particularly limited, the following techniques allow for obtainment of a precursor which is effectively controlled in attachment form.

Namely, SiX particles (preferably, silicon dioxide or silicon nitride particles) are dispersed in a solution including, dissolved therein, a compound including M and another compound including aluminum, followed by drying and desolvation, thereby allowing obtainment of a precursor compound where salts of M and Al are attached on a surface of a SiX particle.

Examples of this process include a process of uniformly dispersing SiX in an aqueous solution of MX and AlX, and adding citric acid to the solution while stirring it to thereby attach citrates of MX and AlX onto a surface of a SiX particle, followed by drying and dehydration to thereby obtain a precursor compound of complex citrate which is to be subjected to firing and synthesis.

Examples of MX and AlX to be used here include nitrate and chloride of M, and nitrate and chloride of aluminum, respectively.

Another technique is to dissolve MX and AlX in water or solvent, and to subsequently and uniformly disperse SiX therein, followed by spraying and drying to thereby obtain a precursor compound where MX and AlX are attached to a surface of SiX particle, the precursor compound being to be subjected to firing.

According to the present invention, there is applied a heat treatment to a precursor compound in a reducing and nitriding atmosphere to thereby decrease an oxygen content and to increase a nitrogen content of the precursor, thereby conducting a reducing and nitriding treatment for producing an α-sialon represented by $M_xSi_{12-(m+n)}Al_{m+n}O_nN_{16-n}$ ($0<x\leq2$).

Suitable as an atmospheric gas to be used for the reducing and nitriding treatment, is an ammonia gas, or a mixed gas of ammonia gas and hydrocarbon gas. It is further possible to adopt a mixed gas of nitrogen gas and argon gas as required, for example.

In case of adoption of ammonia gas, hydrogen in ammonia eliminates oxygen in a precursor, and instead thereof, nitrogen in ammonia is incorporated into the precursor. In case of adoption of a mixed gas of ammonia gas and hydrocarbon gas, the hydrocarbon gas reacts with oxygen in a precursor and the oxygen is removed as $H_2O$, CO, and the like, and instead thereof, nitrogen in ammonia is incorporated into the precursor.

It is necessary for a hydrocarbon gas to be in a gas state under the condition of reaction, and thus hydrocarbon gases of short chains are adopted such as methane, propane, LNG, and the like.

The ratio of hydrocarbon to ammonia in the mixed gas is desirably 3 vol % or less. Exceeding 3 vol % leads to deposition of carbon during firing, which is left in a powder. Although an optimum flow rate of the gas varies depending on a reaction vessel, suitable values are 0.01 to 0.1 m/sec.

The reaction temperature is to be 1,300° C. to 1,800° C., and desirably 1,400° C. to 1,600° C. Within this temperature range, firing at a low temperature allows for obtainment of a fine powder, and firing at a high temperature allows for obtainment of a powder having a slightly large particle size and an excellent crystallinity. Although the reaction time varies depending on a composition, type, and the like of a starting material powder, it is desirable to finish the reaction when an oxygen amount is decreased and a nitrogen amount is increased-by reduction and nitridation of the gas to the theoretical values therefor in α-sialon, respectively. Typical reaction time is 0.5 to 5 hours.

According to the present invention, to promote the gas reduction and nitridation reaction, it is possible to add, into the precursor compound., one reaction accelerator or mixed two or more reaction accelerators selected from fluoride, chloride, sulfate, phosphate, and borate of an element selected from calcium, potassium, and aluminum: followed by a heat treatment in a reducing and nitriding atmosphere.

These reaction accelerators each forms a liquid phase at a high temperature to activate diffusion, thereby effectively promoting the reaction. Further, particle growth is also promoted, so that it is desirable to add any of these reaction accelerators in case of production of a powder having a particularly large particle size.

Among the reaction accelerators, calcium fluoride ($CaF_2$), calcium chloride ($CaCl_2$), aluminum fluoride ($AlF_3$), and aluminum chloride ($AlCl_3$) are excellent in effect.

The addition ratio of the reaction accelerator is preferably within a range of 0.5 g to 20 g relative to 100 g of the precursor compound. Less than 0.5 g leads to a lower reaction promoting effect, and excess of 20 g disadvantageously leads to production of unintended composition.

It is possible to conduct a treatment by a solvent (water, organic solvent, or acid) capable of dissolving therein the reaction accelerator after reaction, as required. Particularly, there is exhibited a higher effect of eliminating the reaction accelerator by an aqueous solution of one or mixed two or more of hydrofluoric acid, sulfuric acid, hydrochloric acid, and nitric acid.

Although the composition of an α-sialon is not particularly limited by the present invention, it is possible to adopt a composition including at least Ca and activation element in MX, in case of synthesizing a phosphor including Ca-α-sialon as a host crystal to be activated by a photoactive rare earth element (Ce, Pr, Nd, Sm, Eu, Tb, Dy, Ho, Er, Tm, Yb, and the like). Particularly, those phosphors including Ca and Eu in MX exhibit a higher luminance.

Among α-sialon powders produced by the above-mentioned methods, those powders turn into phosphors for emitting yellow light, which powders each have a composition represented by $Ca_{x1}Eu_{x2}Si_{12-(m+n)}Al_{m+n}O_nN_{16-n}$ while fully satisfying conditions of $0.4<x_1 \leq 1.5$, $0.01 \leq x_2 \leq 0.4$, $0.8 \leq m \leq 3$, and $0 \leq n \leq 2$.

In an α-sialon powder of this composition, divalent Eu ion acts as an emission center in a manner to absorb ultraviolet light or blue visible light and to emit yellow light. This is a phosphor suitable for a white LED lighting instrument combined with a blue LED.

EMBODIMENTS

The present invention will be described in more detail based on the following Examples, which are disclosed strictly as an aid for readily understanding the present invention, and the present invention is not limited to these Examples.

Example 1

The following synthesis was conducted, so as to obtain a Ca-added α-sialon represented by a composition formula of $Ca_{0.8}Si_{9.6}Al_{2.4}O_{0.8}N_{15.2}$ where m=1.6 and n=0.8 are.

Added into an aqueous solution including Ca and Al was a spherical and amorphous silicon dioxide powder having an averaged particle size of 0.3 μm obtained from a high purity alkoxy silane by a sol-gel process, and citric acid was added into the aqueous solution while stirring and mixing it.

This operation caused citrates of Ca and Al to be adsorbed onto a surface of silicon dioxide, followed by stirring and heating to thereby eliminate a water content and thus dry out the solution. This was followed by heating to 700° C. in air, thereby converting citrates into oxides, respectively. The obtained calcined body was unbound by an agate mortar to thereby obtain a powdery precursor compound. The precursor had a composition (in mol %) of 6.9% CaO-10.34% $Al_2O_3$-82.76% $SiO_2$.

Figure 1:
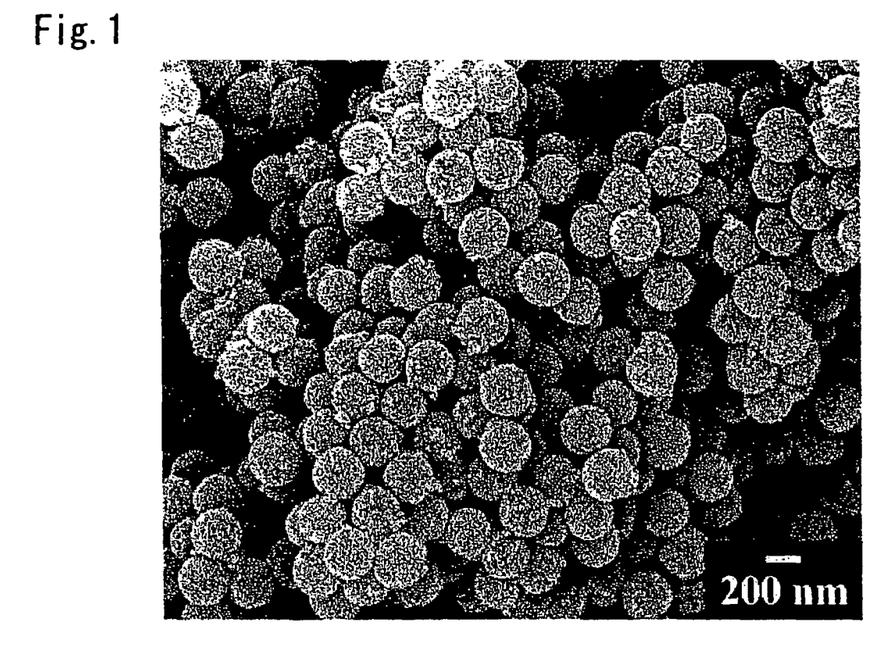
FIG. 1 is a view of a SEM photograph of a precursor of a Ca-including α-sialon (Example 1).

As a result of observation of the precursor by a scanning electron microscope (SEM), there was observed only spherical silicon dioxide as shown in FIG. 1, thereby confirming that CaO and $Al_2O_3$ were adsorbed onto a surface of silicon dioxide as a layered fine powder without aggregation.

Next, about 0.5 g of this precursor compound was put into an alumina boat and set in an annular furnace including a heating element outside an alumina furnace center pipe having an inner diameter of 24 mm, in a manner to place the alumina boat in the furnace center pipe.

Ammonia gas was introduced into the furnace center pipe from one end thereof at a flow rate of 325 ml/min, and the temperature was elevated up to 700° C. at a rate of 500° C./hour. From this elevated temperature, the ammonia gas flow rate was set to be 1,300 ml/min, and simultaneously therewith, a methane gas was introduced into the furnace at a flow rate of 19.5 ml/min, followed by subsequent temperature elevation up to 1,500° C. at a rate of 200° C./hour.

After holding for two hours at this temperature, supply of methane gas was stopped, and cooling was conducted down to a room temperature within an ammonia stream.

The obtained synthetic kept a form of the precursor, and was able to be readily unbound by an agate mortar.

Figure 2:
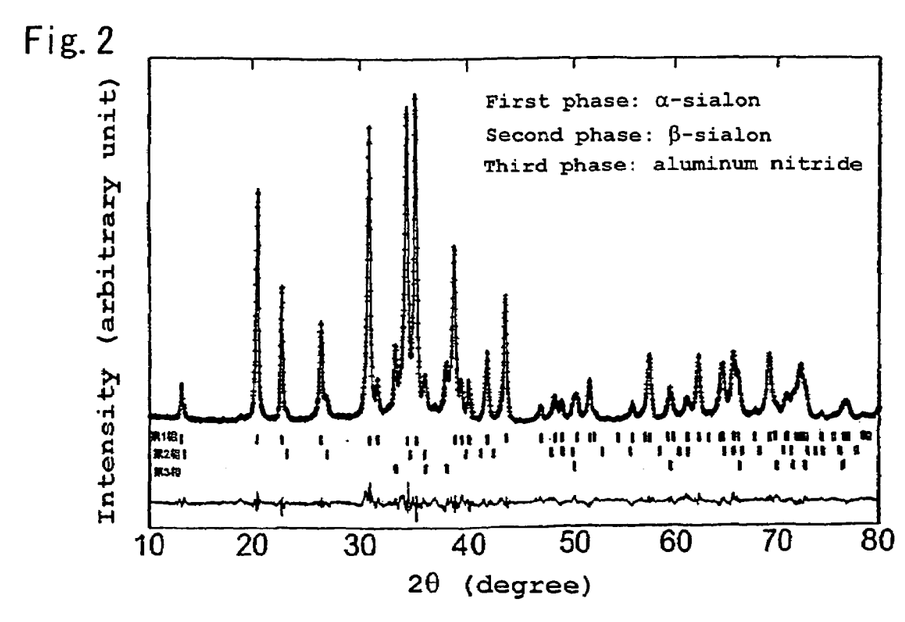
FIG. 2 is a graph of an X-ray diffraction pattern of a synthetic of the Ca-including α-sialon (Example 1).

As a result of observation of the obtained powder by an X-ray diffraction pattern (FIG. 2), it was a mixture of an α-sialon, β-sialon (second phase), and aluminum nitride (third phase), and the content of α-sialon was 86 wt % as a result of Rietveld analysis.

Figure 3:
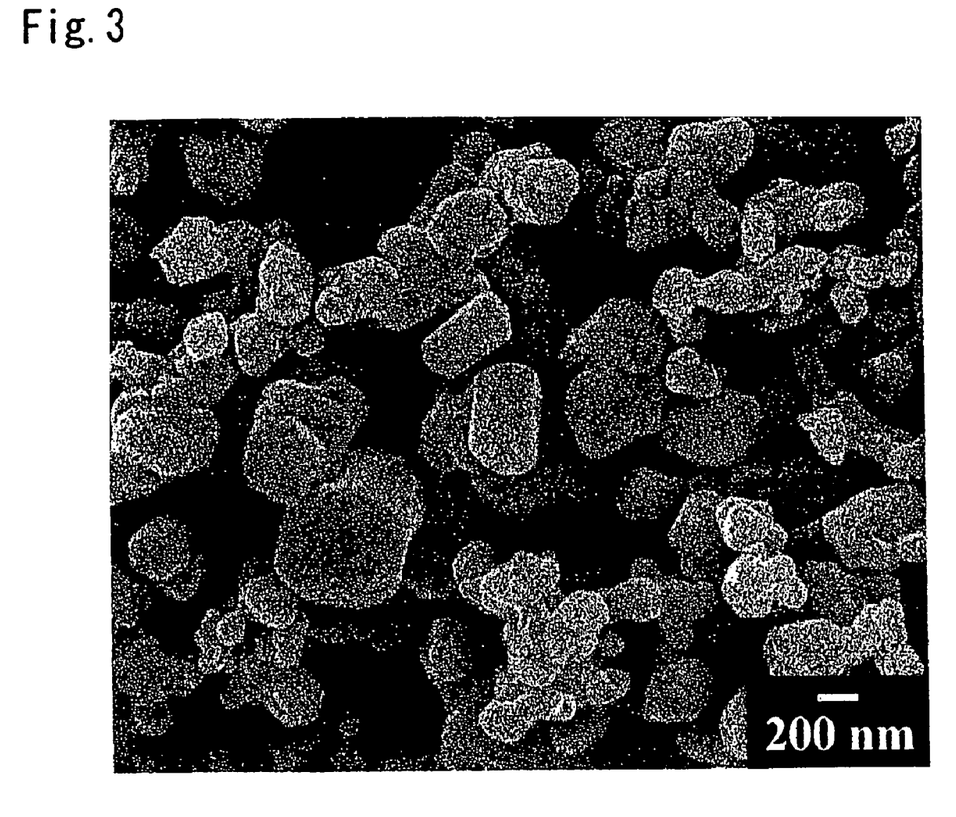
FIG. 3 is a view of a SEM photograph of the synthetic of the Ca-including α-sialon (Example 1).

This powder was observed by a SEM to show a fine and homogeneous form as shown in FIG. 3. Further, measuring a particle size distribution revealed an averaged particle size of 1.8 μm.

Example 2

The following synthesis was conducted, so as to obtain a Y-added α-sialon represented by a composition formula of $Y_{0.6}Si_{9.3}Al_{2.7}O_{0.9}N_{15.1}$ where m=1.8 and n=0.9 are.

Added into an aqueous solution including Y and Al was a spherical and amorphous silicon dioxide powder having an averaged particle size of 0.3 μm obtained from a high purity alkoxy silane by a sol-gel process, and citric acid was added into the aqueous solution while stirring and mixing it.

This operation caused citrates of Y and Al to be adsorbed onto a surface of silicon dioxide, followed by stirring and heating to thereby eliminate a water content and thus dry out the solution.

This was followed by heating to 700° C. in air, thereby converting citrates into oxides, respectively. The obtained calcined body was unbound by an agate mortar to thereby obtain a powdery precursor compound. The precursor had a composition (in mol %) of 2.74% $Y_2O_3$-12.33% $Al_2O_3$-84.93% $SiO_2$.

As a result of observation of the precursor by a scanning electron microscope (SEM), there was observed only spherical silicon dioxide, thereby confirming that $Y_2O_3$ and $Al_2O_3$ were adsorbed onto a surface of silicon dioxide as fine films without aggregation.

Next, about 0.5 g of this precursor compound was put into an alumina boat and set in an annular furnace including a heating element outside an alumina furnace center pipe having an inner diameter of 24 mm, in a manner to place the alumina boat in the furnace center pipe. Ammonia gas was introduced into the furnace center pipe from one end thereof at a flow rate of 325 ml/min, and the temperature was elevated up to 700° C. at a rate of 500° C./hour.

From this elevated temperature, the ammonia gas flow rate was set to be 1,300 ml/min, and simultaneously therewith, a methane gas was introduced into the furnace at a flow rate of 19.5 ml/min, followed by subsequent temperature elevation up to 1,500° C. at a rate of 200° C./hour.

After holding for an hour at this temperature, supply of methane gas was stopped, and cooling was conducted down to a room temperature within an ammonia stream.

Next, the obtained powder was again filled into a crucible made of boron nitride, and the crucible was set in a graphite resistance heating type of electric furnace.

There was conducted a firing operation in a manner to firstly bring a firing atmosphere to vacuum by a diffusion pump, to heat the atmosphere from a room temperature up to 800° C. at a rate of 500° C./hour, to introduce, at 800° C., nitrogen at a purity of 99.999 vol % to thereby establish a pressure of 0.5 Mpa, and to elevate the temperature up to 1,700° C. at a rate of 500° C./hour, followed by holding for 4 hours at this temperature.

The obtained synthetic kept a form of the precursor, and was able to be readily unbound by an agate mortar.

As a result of observation of the obtained powder by an X-ray diffraction pattern, it was a mixture of an α-sialon, β-sialon, and aluminum nitride, and the content of α-sialon was 95 wt %.

This powder was observed by a SEM to show a fine and homogeneous form. Further, measuring a particle size distribution revealed an averaged particle size of 4.3 μm.

Example 3

The following synthesis was conducted, so as to obtain a Ca and Eu-added α-sialon represented by a composition formula of $Ca_{0.75}Eu_{0.25}Si_{8.625}Al_{3.375}O_{1.375}N_{14.625}$.

Added into an aqueous solution including Ca, Eu and Al was a spherical and amorphous silicon dioxide powder having an averaged particle size of 0.3 μm obtained from a high purity alkoxy silane by a sol-gel process, and citric acid was added into the aqueous solution while stirring and mixing it.

This operation caused citrates of Ca, Eu, and Al to be adsorbed onto a surface of silicon dioxide, followed by stirring and heating to thereby eliminate a water content and thus dry out the solution. This was followed by heating to 700° C. in air, thereby converting citrates into oxides, respectively.

The obtained calcined body was unbound by an agate mortar to thereby obtain a powdery precursor compound. The precursor had a composition (in mol %) of 6.7% CaO-1.12% $Eu_2O_3$-15.08% $Al_2O_3$-77.09% $SiO_2$.

Next, about 0.5 g of this precursor compound was put into an alumina boat and set in an annular furnace including a heating element outside an alumina furnace center pipe having an inner diameter of 24 mm, in a manner to place the alumina boat in the furnace center pipe.

Ammonia gas was introduced into the furnace center pipe from one end thereof at a flow rate of 325 ml/min, and the temperature was elevated up to 700° C. at a rate of 500° C./hour. From this elevated temperature, the ammonia gas flow rate was set to be 1,300 ml/min, and simultaneously therewith, a methane gas was introduced into the furnace at a flow rate of 19.5 ml/min, followed by subsequent temperature elevation up to 1,350° C. at a rate of 300° C./hour. After holding for two hours at this temperature, supply of methane gas was stopped, and cooling was conducted down to a room temperature within an ammonia stream.

Next, the obtained powder was again filled into a crucible made of boron nitride, and the crucible was set in a graphite resistance heating type of electric furnace. There was conducted a firing operation in a manner to firstly bring a firing atmosphere to vacuum by a diffusion pump, to heat the atmosphere from a room temperature up to 800° C. at a rate of 500° C./hour, to introduce, at 800° C., nitrogen at a purity of 99.999 vol % to thereby establish a pressure of 0.5 Mpa, and to elevate the temperature up to 1,550° C. at a rate of 500° C./hour, followed by holding for 8 hours at this temperature.

The obtained synthetic kept a form of the precursor, and was able to be readily unbound by an agate mortar. As a result of Rietveld analysis of the obtained powder by an X-ray diffraction pattern, the content of α-sialon was 82 wt %.

This powder was found to be fine, based on an observation by SEM. Further, measuring a particle size distribution revealed an averaged particle size of 3.6 μm.

Figure 4:
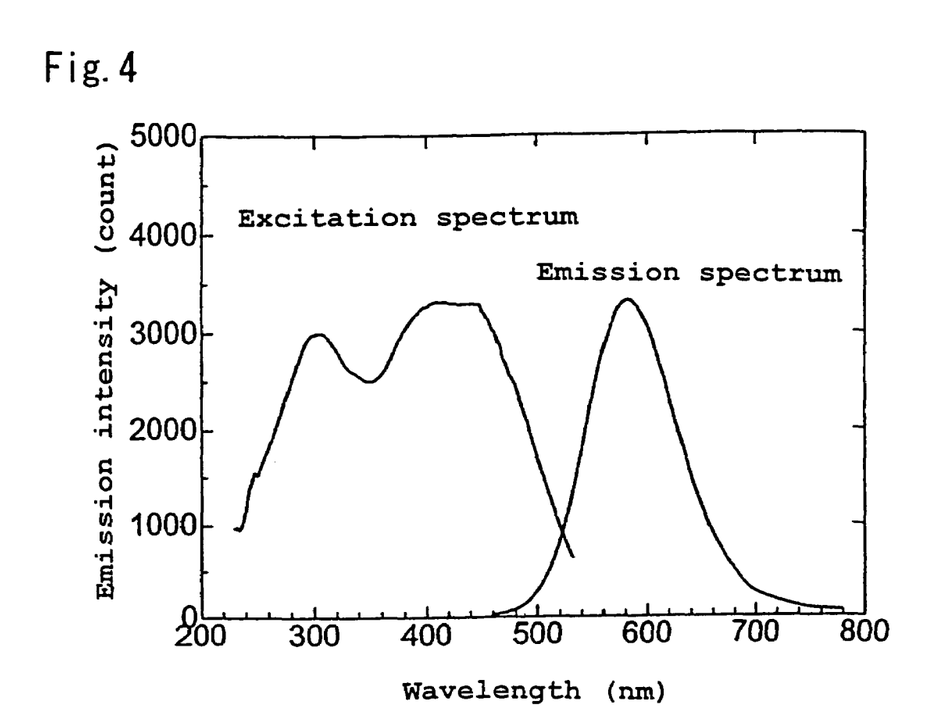
FIG. 4 is a graph of excitation spectrum and emission spectrum of an Eu-including oxynitride (Example 3).

FIG. 4 shows a fluorescence measurement result of the obtained α-sialon, and it was confirmed that the α-sialon had a fluorescence characteristic to be excited by ultraviolet light and visible light in a range of 200 nm to 500 nm and to emit yellow light of 590 nm.

Note that the wavelength at which the α-sialon is excited most effectively, is 450 nm. Such a phosphor is one described in the patent-related reference 1, and it is possible to produce a fine powder of α-sialon phosphor including active Eu according to the technique of the present invention.

Example 4

The following synthesis was conducted, so as to obtain a Ca and Eu-added α-sialon represented by a composition formula of $Ca_{0.75}Eu_{0.25}Si_{8.625}Al_{3.375}O_{1.375}N_{14.625}$.

Added into an aqueous solution including Ca, Eu, and Al was a silicon nitride powder having an averaged particle size of 0.5 μm, and including oxygen at a content of 0.93 wt % and an α-type silicon nitride at a content of 92%, and citric acid was added into the aqueous solution while stirring and mixing it. This operation caused citrates of Ca, Eu, and Al to be adsorbed onto a surface of silicon nitride, followed by stirring and heating to thereby eliminate a water content and thus dry out the solution. This was followed by heating to 700° C. in air, thereby converting citrates into oxides, respectively.

The obtained calcined body was unbound by an agate mortar to thereby obtain a powdery precursor compound. The precursor had a composition (in mol %) of 13.79% CaO-2.3% $Eu_2O_3$-31.03% $Al_2O_3$-52.87% $Si_3N_4$.

Next, about 0.5 g of this precursor compound was put into an alumina boat and set in an annular furnace including a heating element outside an alumina furnace center pipe having an inner diameter of 24 mm, in a manner to place the alumina boat in the furnace center pipe. Ammonia gas was introduced into the furnace center pipe from one end thereof at a flow rate of 325 ml/min, and the temperature was elevated up to 700° C. at a rate of 500° C./hour.

From this elevated temperature, the ammonia gas flow rate was set to be 1,300 ml/min, and simultaneously therewith, a methane gas was introduced into the furnace at a flow rate of 19.5 ml/min, followed by subsequent temperature elevation up to 1,300° C. at a rate of 300° C./hour. After holding for two hours at this temperature, supply of methane gas was stopped, and cooling was conducted down to a room temperature within an ammonia stream.

Next, the obtained powder was again filled into a crucible made of boron nitride, and the crucible was set in a graphite resistance heating type of electric furnace. There was conducted a firing operation in a manner to firstly bring a firing atmosphere to vacuum by a diffusion pump, to heat the atmosphere from a room temperature up to 800° C. at a rate of 500° C./hour, to introduce, at 800° C., nitrogen at a purity of 99.999 vol % to thereby establish a pressure of 0.5 Mpa, and to elevate the temperature up to 1,700° C. at a rate of 500° C./hour, followed by holding for 4 hours at this temperature.

The obtained synthetic kept a form of the precursor, and was able to be readily unbound by an agate mortar. As a result of Rietveld analysis of the obtained powder by an X-ray diffraction pattern, the content of α-sialon was 90 wt %.

This powder was found to be fine, based on an observation by SEM. Further, measuring a particle size distribution revealed an averaged particle size of 3.3 μm.

Figure 5:
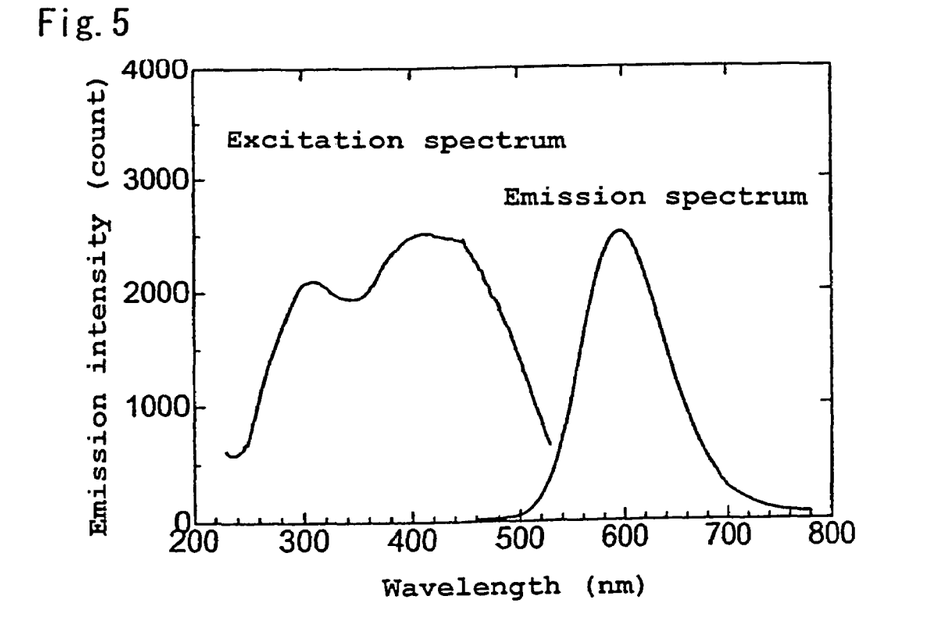
FIG. 5 is a graph of excitation spectrum and emission spectrum of another Eu-including oxynitride (Example 4).

FIG. 5 shows a fluorescence measurement result of the obtained α-sialon, and it was confirmed that the α-sialon had a fluorescence characteristic to be excited by ultraviolet light and visible light in a range of 200 nm to 500 nm and to emit orange light of 600 nm.

Note that the wavelength at which the α-sialon is excited most effectively, is 410 nm. Such a phosphor is one described in the patent-related reference 1, and it is possible to produce a fine powder of α-sialon phosphor including active Eu according to the technique of the present invention.

Examples 5 Through 11

There was adopted the same precursor compound as that in Example 1, and subjected to a reducing and nitriding reaction treatment in each condition, thereby obtaining powders listed in Table 1.

TABLE 1

| | Synthesis temperature (° C.) | Holding time (hour) | Temperature elevation rate (° C./hour) | Nitridation reaction rate (%) | Main constituent phase |
|---|---|---|---|---|---|
| Ex. 5 | 1,500 | 2.0 | 500 | 100 | α-sialon, β-sialon (33%) |
| Ex. 6 | 1,500 | 2.0 | 750 | 100 | α-sialon, β-sialon (46%) |
| Ex. 7 | 1,500 | 2.0 | 300 | 100 | α-sialon, β-sialon (30%) |
| Ex. 8 | 1,400 | 2.0 | 200 | 97 | α-sialon |
| Ex. 9 | 1,425 | 4.0 | 200 | 99 | α-sialon |
| Ex. 10 | 1,450 | 1.0 | 200 | 98 | α-sialon |
| Ex. 11 | 1,500 | 0.5 | 200 | 100 | α-sialon |

INDUSTRIAL APPLICABILITY

The sialon phosphor obtained by the production method of the present invention is finer and has a higher purity than conventional sialon powders, and is thus suitable as a phosphor. Such a fine powder of phosphor is desirable for VFD, FED, PDP, CRT, white LED, and the like, and leads to a great value of provision of a novel material useful in a material design of this field of art, and thus the phosphor is expected to remarkably contribute to industrial development.

The invention claimed is:

1. A production method of an oxynitride powder, comprising the step of:

applying a heat treatment in a reducing and nitriding atmosphere, to a precursor compound including at least constituent elements M, Si, Al, and O (where M is one element or mixed two or more elements selected from Li, Mg, Ca, Sr, Y, La, Ce, Pr, Nd, Sm, Eu, Gd, Tb, Dy, Ho, Er, Tm, Yb, and Lu), thereby decreasing an oxygen content and increasing a nitrogen content of the precursor, wherein the precursor compound is a mixture of: a compound SiX which turns into silicon dioxide, silicon oxynitride, or silicon nitride, by heating; a compound MX which turns into oxide, oxynitride, or nitride of M by heating; and a compound AlX which turns into aluminum oxide, aluminum oxynitride, or aluminum nitride, by heating, and wherein the precursor compound is a compound obtained by applying a heat treatment to a complex citrate to thereby decompose and eliminate citric acid therefrom, the complex citrate being obtained by dispersing the SiX in an aqueous solution including the MX and AlX dissolved therein, followed by addition of citric acid and by drying and dehydration.

2. The production method of an oxynitride powder of claim 1, wherein the precursor compound includes nitrogen (N) therein.

3. The production method of an oxynitride powder of claim 1, wherein the method further comprises the step of:

applying a heat treatment in a reducing and nitriding atmosphere, to the precursor compound, thereby decreasing an oxygen content and increasing a nitrogen content of the precursor, to produce an α-sialon represented by a general formula 4. The production method of an oxynitride powder of claim 1, wherein the SiX is one compound or mixed two or more compounds selected from silicon dioxide ($SiO_2$), silicon oxynitride ($Si_2N_2O$), and silicon nitride ($Si_3N_4$).

5. The production method of an oxynitride powder of claim 1, wherein the MX is one compound or mixed two or more compounds selected from oxide, hydroxide, alkoxide, carbonate, nitrate, and chloride, of M.

6. The production method of an oxynitride powder of claim 1, wherein the AlX is one compound or mixed two or more compounds selected from oxide, hydroxide, alkoxide, carbonate, nitrate, and chloride, of aluminum.

7. The production method of an oxynitride powder of claim 1, wherein the MX and AlX are attached to a surface of the SiX.

8. The production method of an oxynitride powder of claim 1, wherein the precursor compound is a mixture obtained by dispersing SiX particles in a solution including the MX and AlX dissolved therein followed by drying and desolvation, the mixture being in a form where compounds of the M and Al are attached to a surface of a SiX particle.

9. The production method of an oxynitride powder of claim 1, wherein the reducing and nitriding atmosphere includes at least an ammonia gas.

10. The production method of an oxynitride powder of claim 1, wherein the reducing and nitriding atmosphere is a mixed gas atmosphere of ammonia and hydrocarbon gas.

11. The production method of an oxynitride powder of claim 10, wherein the hydrocarbon gas is a methane or propane gas.

12. The production method of an oxynitride powder of claim 1, wherein the M includes at least Ca.

13. The production method of an oxynitride powder of claim 1, wherein the M includes at least Eu.

14. The production method of an oxynitride powder of claim 1, further comprising the step of:

adding, into the precursor compound, one reaction accelerator or mixed two or more reaction accelerators selected from fluoride, chloride, sulfate, phosphate, and borate of an element selected from calcium, potassium, and aluminum, followed by a heat treatment in a reducing and nitriding atmosphere, thereby decreasing an oxygen content and increasing a nitrogen content of the precursor, to produce an α-sialon represented by a general formula

15. The production method of an oxynitride powder of claim 1, wherein the SiX has an averaged particle size of 2 μm or less.

16. A production method of an oxynitride powder, comprising the step of:

applying a heat treatment in a reducing and nitriding atmosphere, to a precursor compound including at least constituent elements M, Si, Al, and O (where M is one element or mixed two or more elements selected from Li, Mg, Ca, Sr, Y, La, Ce, Pr, Nd, Sm, Eu, Gd, Tb, Dy, Ho, Er, Tm, Yb, and Lu), thereby decreasing an oxygen content and increasing a nitrogen content of the precursor, wherein the precursor compound is a mixture of: a compound SiX which turns into silicon dioxide, silicon oxynitride, or silicon nitride, by heating; a compound MX which turns into oxide, oxynitride, or nitride of M by heating; and a compound AlX which turns into aluminum oxide, aluminum oxynitride, or aluminum nitride, by heating, and wherein MX particles and AlX particles have averaged particle sizes smaller than that of SiX particles, respectively.

17. A production method of an oxynitride powder, comprising the step of:

applying a heat treatment in a reducing and nitriding atmosphere, to a precursor compound including at least constituent elements M, Si, Al, and O (where M is one element or mixed two or more elements selected from Li, Mg, Ca, Sr, Y, La, Ce, Pr, Nd, Sm, Eu, Gd, Tb, Dy, Ho, Er, Tm, Yb, and Lu), thereby decreasing an oxygen content and increasing a nitrogen content of the precursor, wherein the precursor compound is a mixture of: a compound SiX which turns into silicon dioxide, silicon oxynitride, or silicon nitride, by heating; a compound MX which turns into oxide, oxynitride, or nitride of M by heating; and a compound AlX which turns into aluminum oxide, aluminum oxynitride, or aluminum nitride, by heating, and wherein the precursor compound is a complex citrate obtained by dispersing the SiX in an aqueous solution including the MX and AlX dissolved therein, followed by addition of citric acid and by drying and dehydration.

* * * * *